(12) United States Patent
Tsai (10) Patent No.: US 7,110,626 B2
(45) Date of Patent: Sep. 19, 2006

(54) FIBER OPTIC VIBRATION SENSOR

(75) Inventor: Woo-Hu Tsai, Taipei (TW)

(73) Assignee: Tatung Co., Ltd., (TW)

( * ) Notice: Subject to any disclaimer, the term of this patent is extended or adjusted under 35 U.S.C. 154(b) by 84 days.

(21) Appl. No.: 10/962,572

(22) Filed: Oct. 13, 2004

(65) Prior Publication Data

US 2005/0109922 A1   May 26, 2005

(30) Foreign Application Priority Data

Nov. 21, 2003  (TW) ............................. 92132708 A (51) Int. Cl.
*G02B 6/00* (2006.01)
*G01J 5/08* (2006.01)

(52) U.S. Cl. .......................... 385/12; 385/37; 385/31; 250/227.14; 250/227.11

(58) Field of Classification Search ................. 385/12, 385/31, 30, 42, 14, 24; 250/227.11, 227.14, 250/227.15, 227.16, 227.17, 227.18
See application file for complete search history.

(56) References Cited

U.S. PATENT DOCUMENTS

| 5,421,195 | A  | * | 6/1995 | Wlodarczyk ............... 73/115 |
| 6,516,117 | B1 | * | 2/2003 | Fujimaki et al. ........... 385/37 |
| 6,807,325 | B1 | * | 10/2004 | Kraemmer et al. ........ 385/13 |
| 2005/0109922 | A1 | * | 5/2005 | Tsai ..................... 250/227.14 |
| 2005/0163424 | A1 | * | 7/2005 | Chen ........................ 385/37 |

FOREIGN PATENT DOCUMENTS

JP        2000292433 A   * 10/2000

* cited by examiner

*Primary Examiner*—Brian M. Healy
(74) *Attorney, Agent, or Firm*—Bacon & Thomas PLLC (57) ABSTRACT

A fiber optic vibration sensor is disclosed. This invention has an optical fiber of a tubular configuration that includes a cladding layer and a core, having a first end, a second end and a sensing region; a source of laser for emitting laser onto the first end of the optical fiber; an optical diode connected to the second end of the optical fiber; and an optical wave analyzer connected to the optical diode; wherein the sensing region includes at least a polished region formed by polishing a side of the optical fiber and a grating disposed in the polishing region.

10 Claims, 13 Drawing Sheets

FIBER OPTIC VIBRATION SENSOR

BACKGROUND OF THE INVENTION

1. Field of the Invention

The present invention relates to a fiber optic vibration sensor, and more particularly to a fiber optic vibration sensor comprising a single grating.

2. Description of Related Art

A traditional mechanical vibration sensor is large in size and heavy in weight. Hence, there are disadvantages of a narrow range of frequency responses, low sensitivity and limited scope of applications.

Fiber optic sensors have advantages of being resistant to electromagnetic interference, water and erosion, and have further advantages of low transmission loss and high precision effect. Thus, the fiber optic vibration sensor is one of the means for solving the disadvantages of the above-mentioned mechanical vibration sensor.

Even so, the common fiber optic sensor for measuring various physical properties generally is subject to the configuration or design thereof, and so is unable to meet the requirements of being compact, lightweight and economic in manufacture. If the optic fiber sensors serve as the vibration sensors, the characteristics of high sensitivity and a wide range of frequency responses will be missing.

Another known fiber optic sensor fiber optic sensor having highly-stable intensity primarily adopts a pair of Bragg gratings for sandwiching a sensing region formed by removing part of the cladding layer of a common optical fiber and then evaporating or doping a medium capable of reacting with an ambient material. In this connection, the light reflected from the optical fiber grating will be altered as a result of change in the sensing region. This is useful for probating a mechanical or chemical-reactive environment, but definitely cannot be used as a vibration sensor.

Therefore, it is desirable to provide an improved fiber optic sensor to mitigate and/or obviate the aforementioned problems.

SUMMARY OF THE INVENTION

The object of the present invention is to provide a fiber optic vibration sensor that is compact, lightweight, and highly sensitive, with a broad range of frequency responses so as to sense and measure the frequency and amplitude of various vibration sources.

To attain the aforesaid object, a fiber optic vibration sensor according to the present invention comprises an optical fiber of a tubular configuration comprised of a cladding layer and a core, having a first end, a second end and a sensing region; a source of laser for emitting laser onto the first end of the optical fiber; an optical diode connected to the second end of the optical fiber; and an optical wave analyzer connected to the optical diode; wherein the sensing region comprises at least a polished region formed by polishing a side of the optical fiber and a grating mounted in the polishing region.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
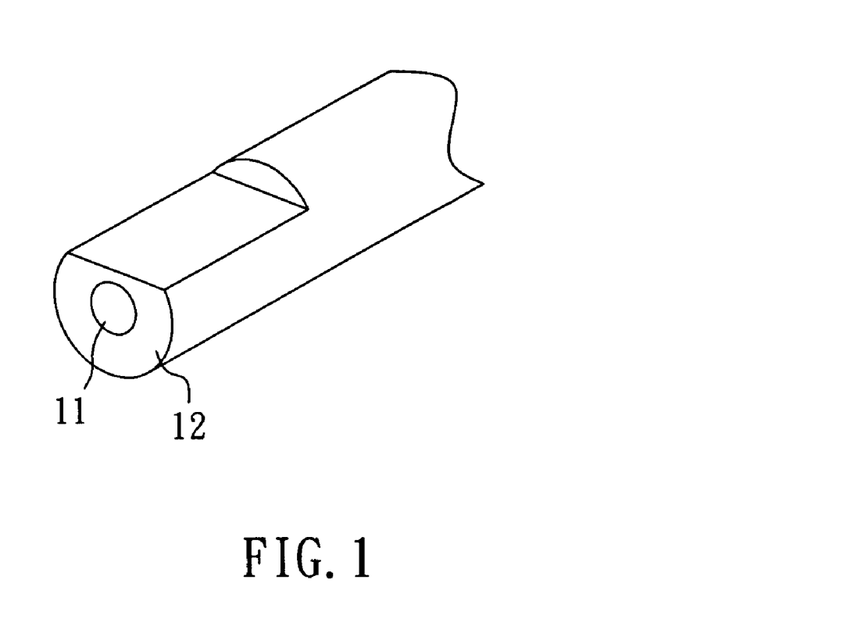
FIG. 1 is a schematic view of an optical fiber.
Figure 2A:
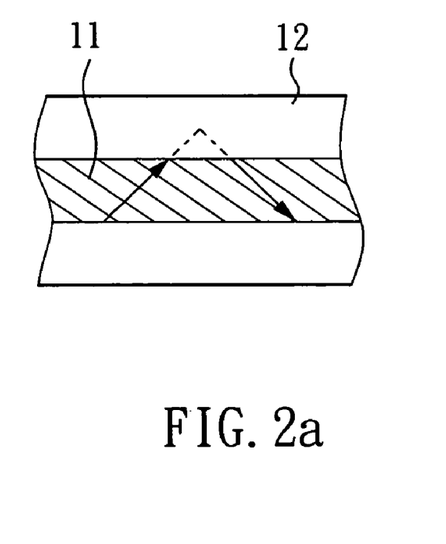
FIGS. 2a and 2b are schematic views of evanescent fields in an optical fiber.
Figure 2B:
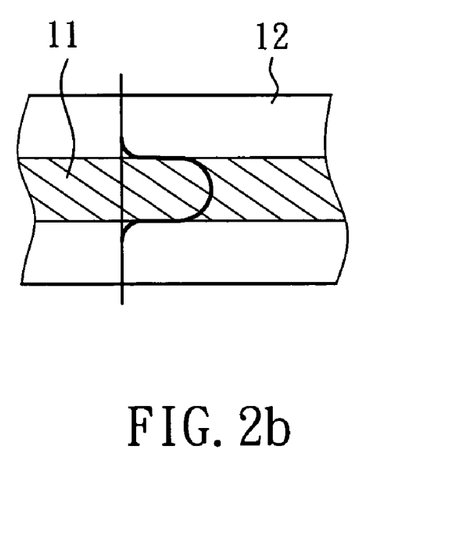

In general, an optical fiber is comprised of a cladding layer 12 and a core 11 where light rays travel through, as shown in FIG. 1. Because the refractive index of the core is different from that of the cladding layer, the light rays stay in the core by full-reflection. As a result, there is theoretically no transmission loss. However, part of the light rays dissipate in practical use; especially after the side of the optical fiber has been polished the dissipation of the light rays is significantly increased, as shown in FIG. 1. Evanescent fields in the optical fiber at this moment are shown in FIGS. 2a and 2b. As illustrated, the energy of the optical wave has the maximum intensity in the core 11, being gradually decreased as approaching to the cladding layer 12.

Figure 3A:
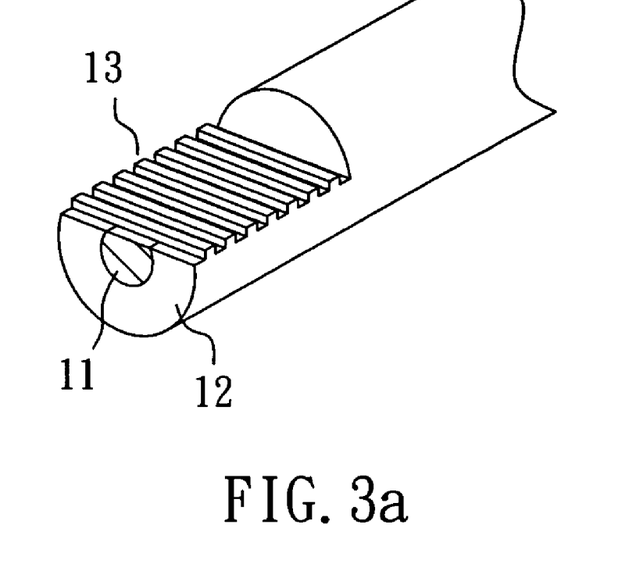
FIGS. 3a and 3b are schematic views of an optical fiber and light rays in the optical fiber according to the present invention.
Figure 3B:
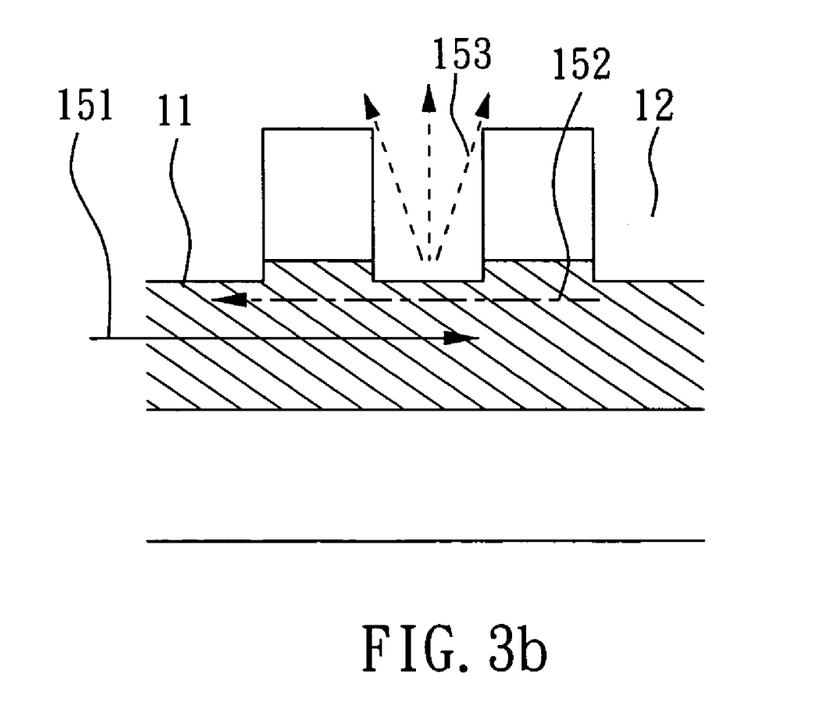

Referring now to FIG. 3a, a grating 13 is added to a polished region of a side-polished optical fiber according to the present invention to form a vibration sensitive region. FIG. 3b shows a cross-sectional view of the optical fiber. The light rays in the optical fiber can be separated into three portions including transmitted light 151, reflected light 152 and dissipated light 153. Hence, the intensity of the transmitted light 151 or the reflected light 152 is varied subject to the dissipation caused by the dissipated light 153.

Unlike the prior art, the present invention uses a single grating. The evanescent field of the optical waves in the optical fiber is characterized by high light dissipation at the non-continuous interface of the grating. The geometrical configuration of the grating in the side-polished region vibrates corresponding to a vibration of the optical fiber. Hence, the dissipation caused by the dissipated light 153 will be varied. Thus, the transmitted light 151 and the reflected light 152 will have different intensities. Then, an optical wave analyzer mounted at the tail of the optical fiber is used for analyzing the transmitted light 151 to obtain changes in intensity of the amplitude of the optical waves. After signal analysis and conversion, the intensity and frequency of the vibration so made are sensed and measured. Although only the transmitted light 151 is described, the idea is applicable to the analysis of the reflected light 152 to obtain the intensity of a vibration based on the same principle as disclosed in this invention. Thus, this idea also falls within the scope of the present invention.

A method for forming a grating on a side-polished optical fiber is achieved by photolithography, comprising the steps of: coating a photoresist layer over the polished region, patterning a grating on the photoresist layer by development, and forming the grating by etching; wherein the grating is a number of parallel rectangle-shaped grooves formed on the photoresist layer, the rectangle-shaped grooves being longitudinally perpendicular to the core axis of the optical fiber.

It is important for the present invention to form the grating having a configuration to the exposure of the core of the optical fiber. Also, the configuration of the grating preferably is formed by dry etching so that the sidewall of the grating being etched is perpendicular to the center axis of the optical fiber to cause optimum sensing effect.

It must be noted that the period of the grating of a fiber optic vibration sensor according to the present invention is not specifically defined. Preferably, the period length is between 8 and 15 µm to avoid any significant Bragg reflection from occurring.

A comparative example and four preferred embodiments of the invention will be described with reference to the accompanying drawings for illustrating the present invention.

COMPARATIVE EXAMPLE

Figure 4:
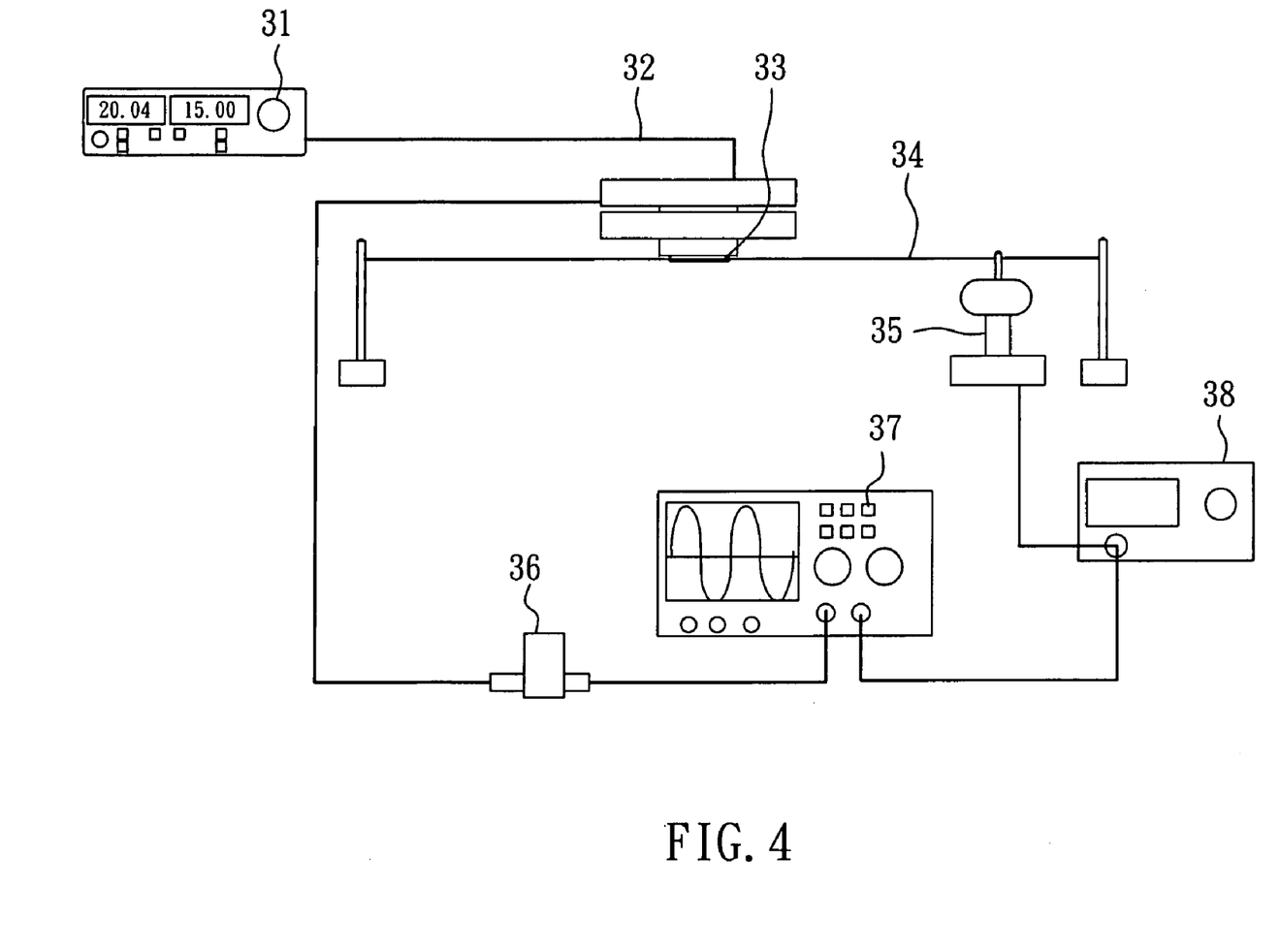
FIG. 4 is a schematic view of a sensing and measuring system according to a comparative example of the present invention.

This comparative example uses a common side-polished sensor system for detecting a string wave resonance as shown in FIG. 4. As illustrated, there is a source of laser 31, an optical fiber 32 connected to the laser source 31, a side-polished fiber optic sensor 33 formed on the optical fiber 32, a sliver 34 in contact with the fiber optic sensor 33, a vibrator 35 connected to the sliver 34 to generate a vibration wave on the sliver 34, an optical diode 36 connected to the optical fiber 32, an oscilloscope 37 connected to optical diode 36 via the optical fiber 32, and a vibration modulator 38 connected to the oscilloscope 37 and the vibrator 35 for generating vibration waves of different frequencies.

The string wave resonance caused by string waves of different wavelengths and frequencies is to achieve the test for the sensitivity of the vibration sensor.

Figure 5A:
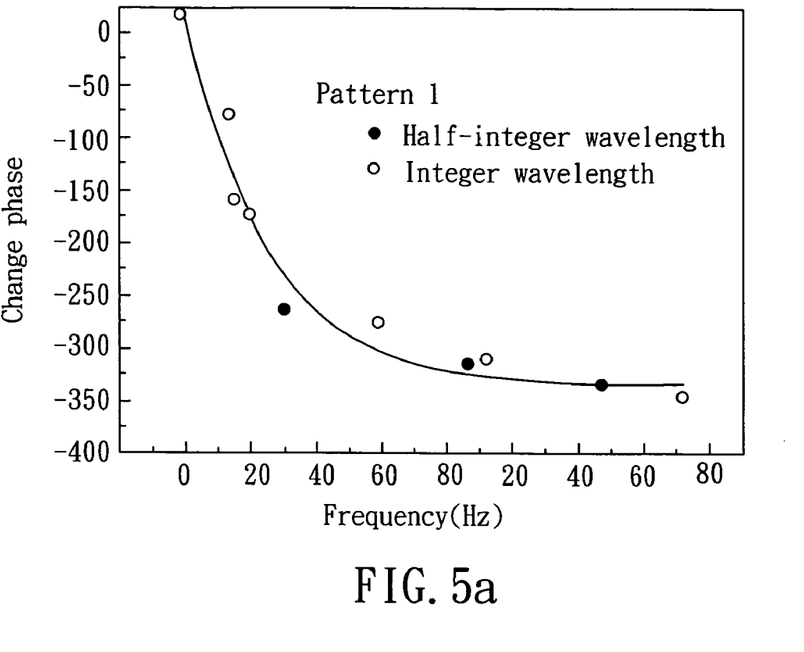
FIGS. 5a and 5b are diagrams illustrating results of sensing and measuring the comparative example of the present invention.
Figure 5B:
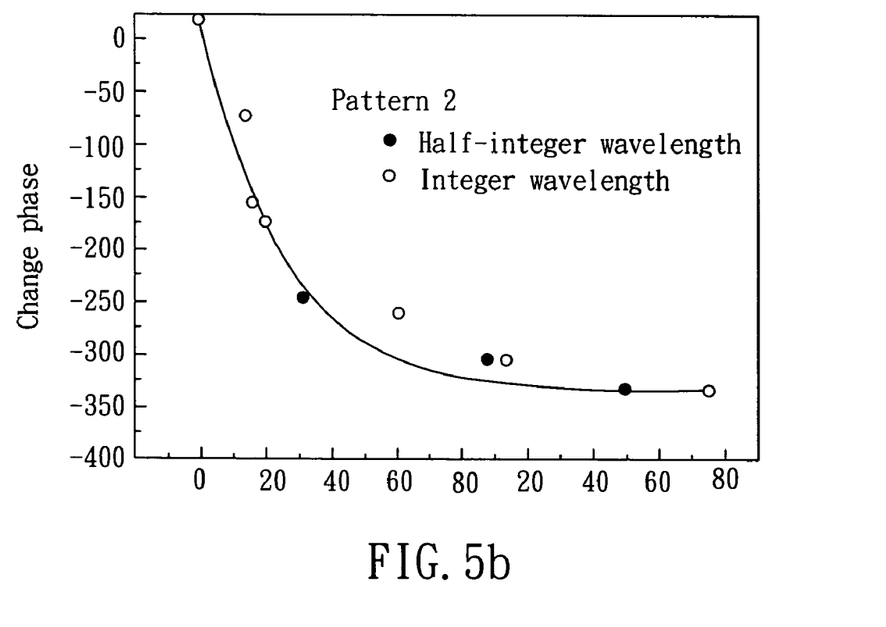

The side-polished fiber optic sensor is made by polishing a side of the optical fiber. The vibration is detected by the principle of the evanescent field in the optical fiber. FIGS. 5a and 5b show the results detected by the side-polished fiber optic sensor. It can be seen from the detecting results in FIGS. 5a and 5b that a first order relationship exists between the phase change and the frequency.

Figure 6A:
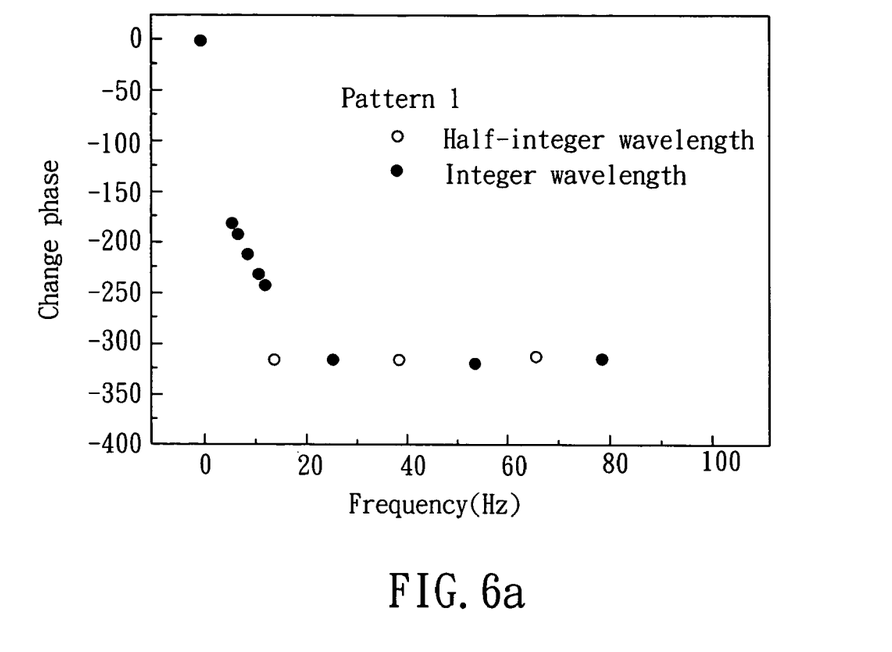
FIGS. 6a and 6b are diagrams illustrating results of sensing and measuring string waves caused by a first embodiment of a grating-type fiber optic vibration sensor according to the present invention.
Figure 6B:
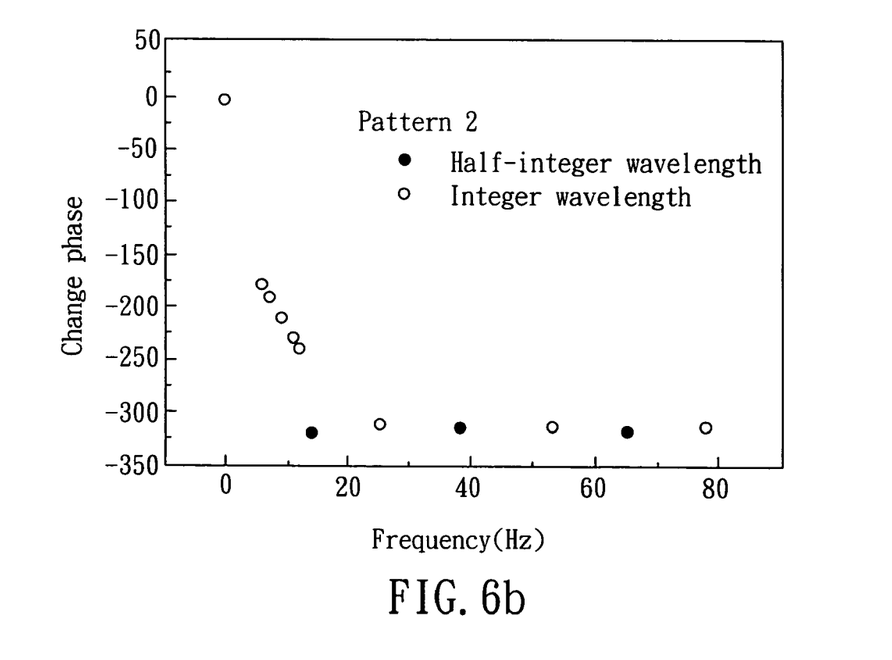

Embodiment 1 Detecting a String Wave Resonance with a Grating-Type Fiber Optic Vibration Sensor This embodiment uses a side-polished optical fiber for further forming a fiber optic vibration sensor having a grating in the side-polished region (forming a vibration sensitive region) to detect a string wave resonance. The system of this embodiment is disposed as that of the comparative example, except this embodiment adopts a grating-type fiber optic vibration sensor, other than the side-polished fiber optic sensor 33 of the comparative example, for sensing and measurement. The detecting results are illustrated in FIGS. 6a and b. As FIGS. 6a and b indicate that there is a zero order relationship between the phase change and the frequency. Comparing such a zero order relationship with the first order relationship of the comparative example, it is clear that the grating-type fiber optic vibration sensor of the present invention has higher sensitivity.

Embodiment 2 Vibration Frequency Response

Figure 7:
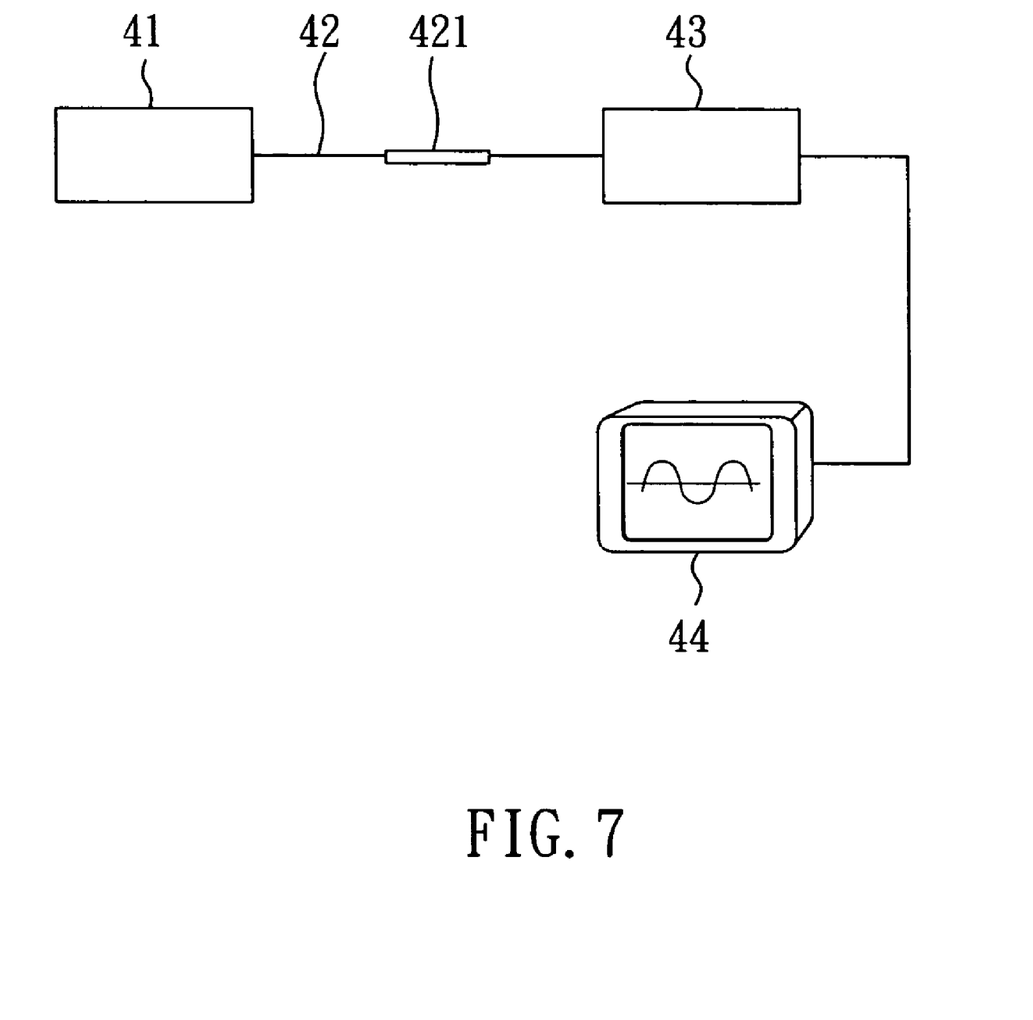
FIG. 7 is a schematic view of a sensing and measuring system according to a second embodiment of the present invention.

A sensing and measuring system of this embodiment as shown in FIG. 7 comprises a source of laser 41, an optical fiber 42, an optical diode 43 and a storage-type oscilloscope 44, wherein a grating sensor (vibration sensitive region) 421 is fabricated in the middle of the optical fiber 42 for detecting a vibration frequency.

Figure 8A:
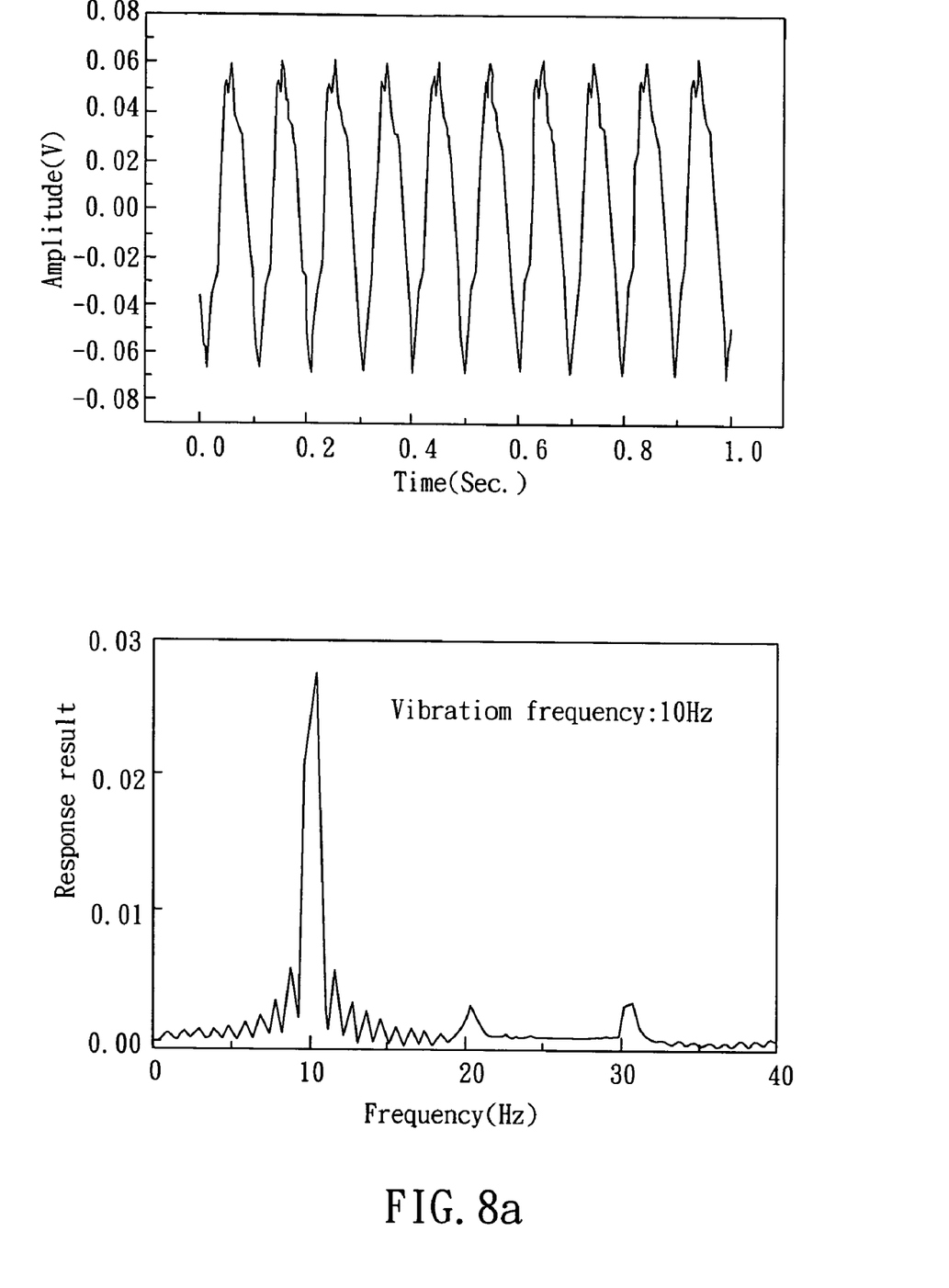
FIGS. 8a, 8b and 8c are diagrams illustrating changes of amplitude versus time and amplitude versus frequency for the second embodiment of the present invention.
Figure 8B:
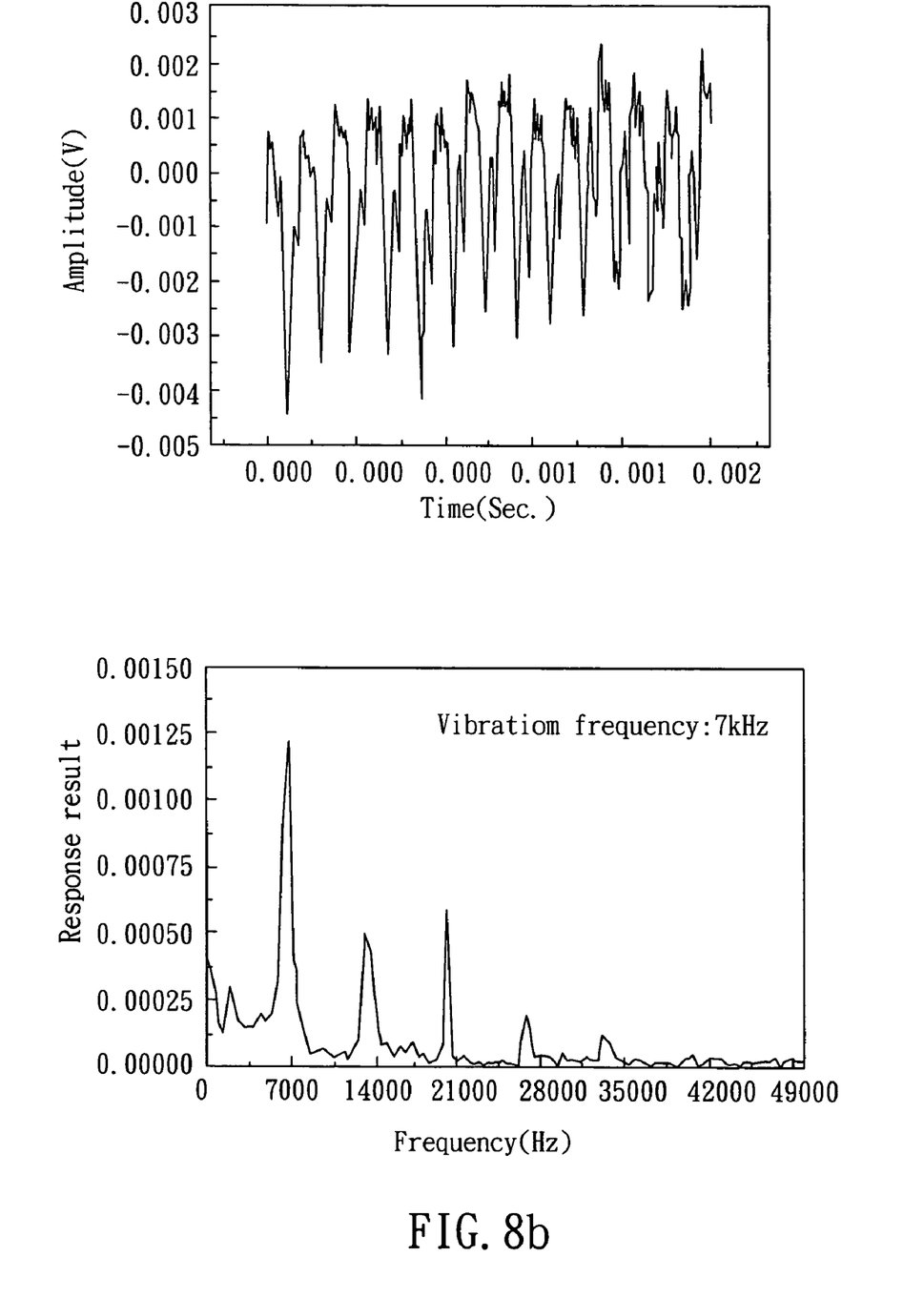
Figure 8C:
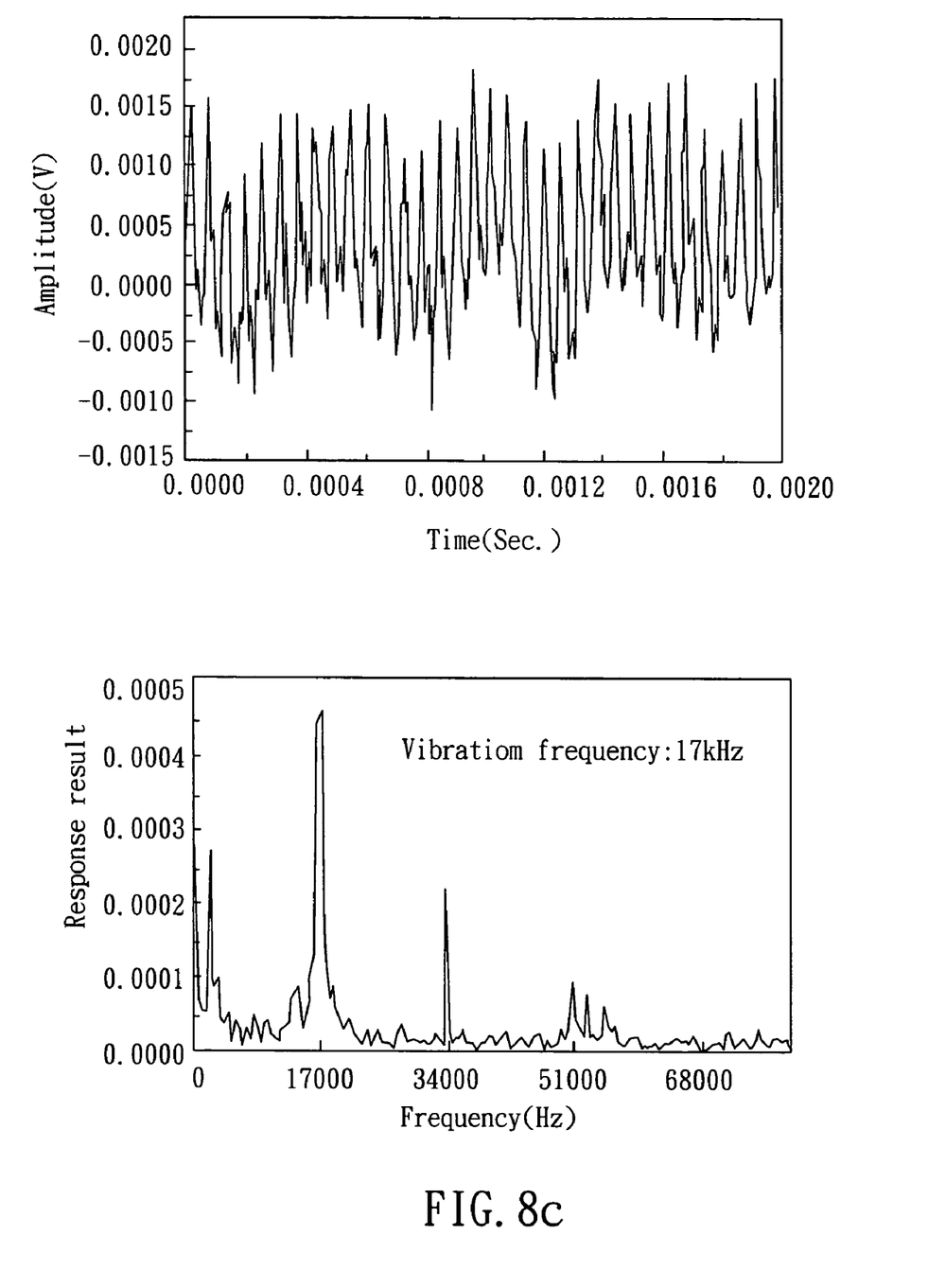

This embodiment adopts a vibrator to cause a sliver to generate vibration waves of 10 Hz, 7 KHz and 17 KHz frequencies, and the grating sensor 421 contacts the sliver for testing the detectable range of frequencies of the fiber optic vibration sensor according to the present invention. Diagrams of amplitude versus time and amplitude versus frequency being detected are shown in FIGS. 8a, 8b and 8c, respectively. As illustrated, the response resulting from the fiber optic vibration sensor according to the present invention is very sharp. Hence, all the vibration frequencies under test can be well detected.

Embodiment 3 Ultrasonic Vibration Response in Water

Figure 9A:
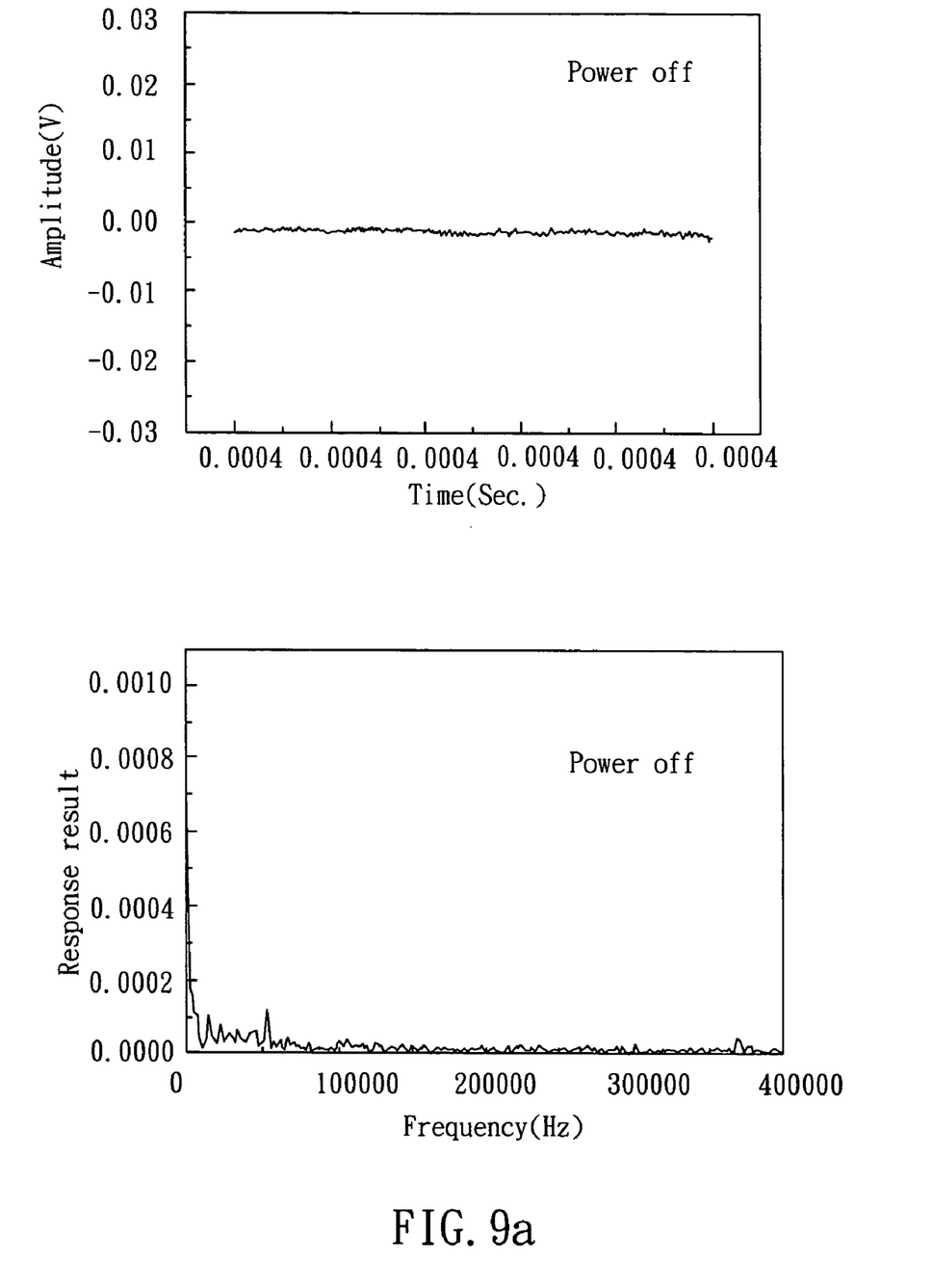
FIGS. 9a and 9b are diagrams illustrating results of a third embodiment of the present invention with and without application of ultrasonic vibration waveforms and Fast Fourier Transform, respectively.
Figure 9B:
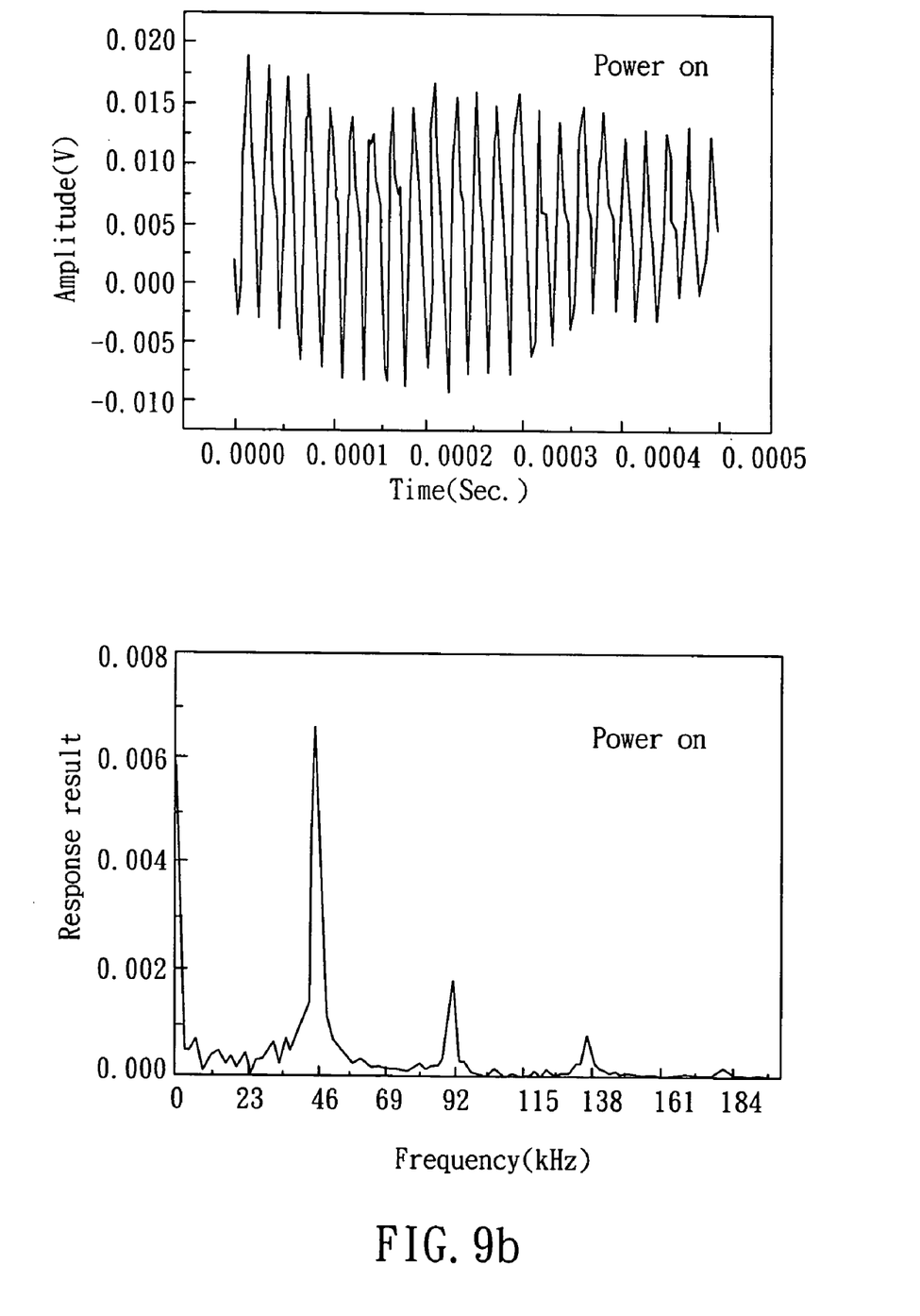

This embodiment adopts an ultrasonic cleaner for hospitals to generate a vibration source of ultrasonic waves. Also, a fiber optic vibration sensor according to the present invention is disposed in water for detecting a response. FIG. 9a shows waveforms detected before vibration and results of Fast Fourier Transform while FIG. 9b shows waveforms of ultrasonic vibration and results from Fast Fourier Transform. These diagrams indicate that the fiber optic vibration sensor according to the present invention has high sensitivity to be capable of detecting a vibration frequency of ultrasonic wave at 46 KHz.

Embodiment 4 Pulse Measurement

Figure 10A:
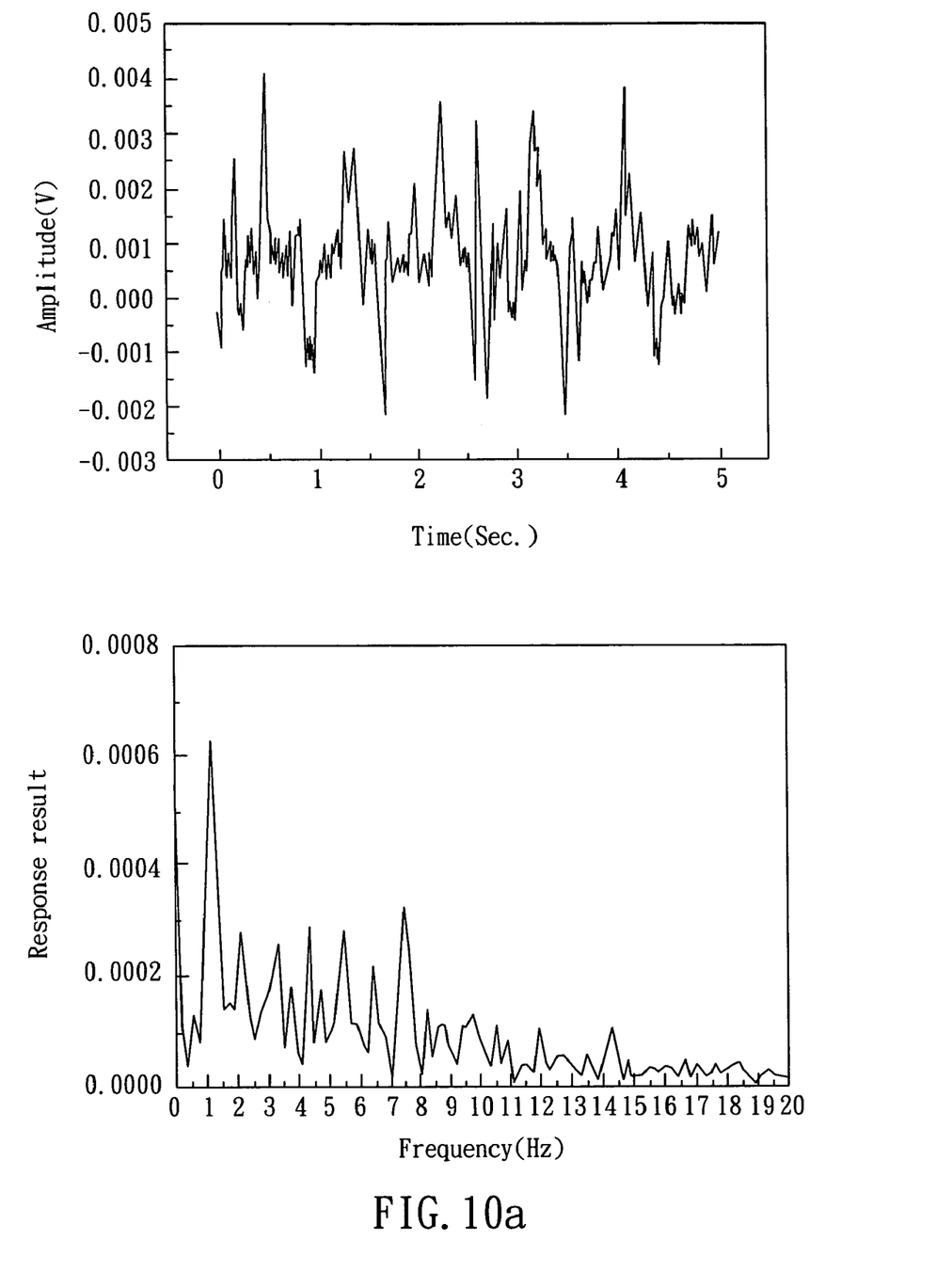
FIGS. 10a and 10b are diagrams illustrating results for sensing and measuring the pulse according to a fourth embodiment of the present invention with and without application of a plastic soft ball, respectively.
Figure 10B:
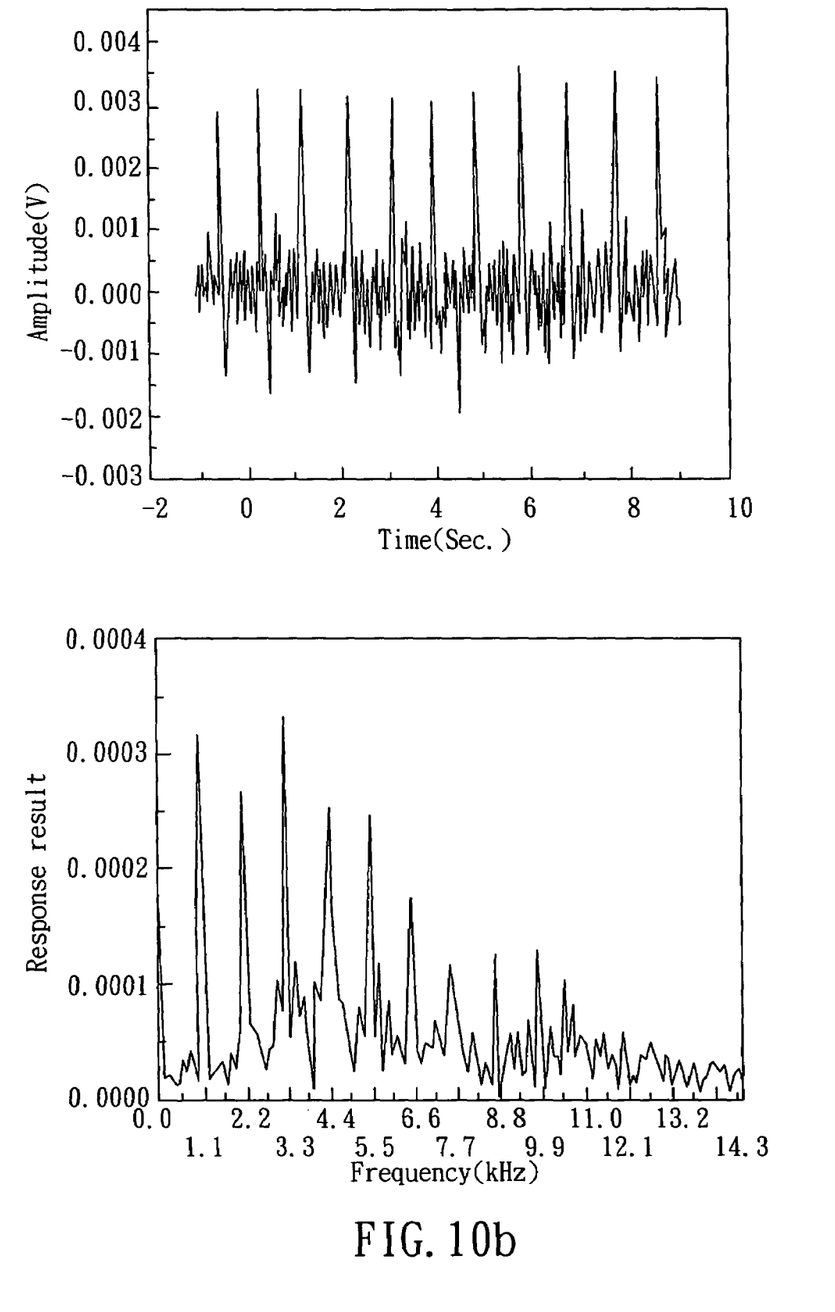

This embodiment uses a fiber optic vibration sensor according to the present invention with or without application of a plastic soft ball mounted between the fiber optic vibration sensor and a subject's wrist for determining the subject's pulse to test for the sensitivity of the sensing and determination. FIG. 10a shows a result of sensing and measurement without having the plastic soft ball while FIG. 10b shows a result measurement with the plastic soft ball. These diagrams indicate that the sensing and measuring effect is greatly improved when the plastic soft ball is provided, though the sensitivity in the case of the absence of the plastic soft ball is already reliable.

It can be found from the above embodiments that the present invention has advantages of dispensing with the need of a first grating and a second grating in the prior art wherein one of the first or second grating serves as a reference signal. Since only single grating is required and the transmitted or reflected light is used to serve as the reference signal, the manufacturing time and cost are reduced. Also, the sensitivity is increased, as compared with the prior art. After the grating is formed on the side-polished optical fiber, an interference-type sensor is transformed into an intensity-type optical sensor having high sensitivity to the light. In addition to the extremely high sensitivity associated with the grating-type fiber optic vibration sensor, a vibration at 46 KHz frequency, e.g., ultrasonic wave, is also detectable. Thus, this invention is capable of clearly detecting a weak vibration signal such as the pulse. The advantages of the present invention are thus remarkable.

Although the present invention has been explained in relation to its preferred embodiments, it is to be understood that many other possible modifications and variations can be made without departing from the spirit and scope of the invention as hereinafter claimed.

What is claimed is:

1. A fiber optic vibration sensor, comprising:
    an optical fiber of a tubular configuration comprised of a cladding layer and a core, having a first end, a second end and a vibration sensitive region, the vibration sensitive region being configured to cause a variation of transmitted or reflected light rays in said optical fiber according to a vibration of said optical fiber;
    a source of laser for emitting laser light rays onto said first end of said optical fiber;
    an optical diode connected to said second end of said optical fiber; and
    an optical wave analyzer connected to said optical diode and adapted to sense variations in light rays in said optical fiber caused by said vibration sensitive region;
    wherein said vibration sensitive region comprises at least a polished region formed by polishing a side of said optical fiber and a grating formed in said polishing region.

2. The fiber optic vibration sensor of claim 1, wherein said polished region is being polished to expose said core.

3. The fiber optic vibration sensor of claim 1, wherein said grating is formed by the steps of:
    coating a photoresist layer over said polished region;
    patterning a grating on said photoresist layer by development; and
    forming said grating by etching;
    wherein said grating is a quantity of parallel rectangle-shaped grooves formed on said photoresist layer, said rectangle-shaped grooved being longitudinally perpendicular to the core axis of said optical fiber.

4. The fiber optic vibration sensor of claim 1, wherein the length of a period of said grating is between 8 and 15 µm.

5. The fiber optic vibration sensor of claim 1, wherein said optical wave analyzer is a storage-type oscilloscope.

6. The fiber optic vibration sensor of claim 1, wherein at least one bottom of said grating is part of said core.

7. The fiber optic vibration sensor of claim 2, wherein the length of a period of said grating is uniform.

8. The fiber optic vibration sensor of claim 1, wherein the depth of said grating is uniform.

9. The fiber optic vibration sensor of claim 1, wherein said grating comprises a quantity of parallel rectangular grooves.

10. The fiber optic vibration sensor of claim 9, wherein the rectangular grooves are longitudinally perpendicular to the core axis of said optical fiber.

* * * * *